United States Patent [19]
Holmes et al.

[11] Patent Number: 5,081,588
[45] Date of Patent: Jan. 14, 1992

[54] START FROM STOP CONTROL METHOD

[75] Inventors: Russell C. Holmes, Troy; Thomas A. Genise, Dearborn; Ronald K. Markyvech, Allen Park; William J. Mack, Clarkston, all of Mich.

[73] Assignee: Eaton Corporation, Cleveland, Ohio

[21] Appl. No.: 498,510

[22] Filed: Mar. 26, 1990

[51] Int. Cl.⁵ .............................................. B60K 41/10
[52] U.S. Cl. .................................. 364/424.1; 74/866
[58] Field of Search ...................... 364/424.1; 74/866; 192/0.052, 0.084, 0.09, 0.092

[56] References Cited

U.S. PATENT DOCUMENTS

| | | | |
|---|---|---|---|
| 4,648,290 | 3/1987 | Dunkley et al. | 74/866 |
| 4,676,115 | 6/1987 | Morscheck et al. | 74/339 |
| 4,714,144 | 12/1987 | Speranza | 364/424.1 |
| 4,735,109 | 4/1988 | Richards | 74/745 |
| 4,754,665 | 7/1988 | Vandervoort | 74/745 |
| 4,873,637 | 10/1989 | Braun | 364/424.1 |
| 4,874,070 | 10/1989 | Nellums et al. | 192/0.052 |
| 4,899,858 | 2/1990 | Coté et al. | 192/0.09 |

Primary Examiner—Salvatore Cangialosi
Attorney, Agent, or Firm—H. D. Gordon

[57] ABSTRACT

A control system/control method for controlling the jaw clutch engagement and at least partially automated multiple speed change gear mechanical transmission (10) is provided. The control includes a central processing unit (106) for receiving signals indicative of transmission input shaft (16) speed, transmission output shaft (90) speed and of a selected ratio to be engaged. The control unit initiates/permits engagement of the jaw clutch members associated with the selected ratio upon sensing that the rotational speed of the input shaft falls within a calculated synchronous window. The control unit senses vehicle start from stop conditions and/or degraded clutch operation during vehicle start from stop conditions and responds thereto by enlarging the synchronous window.

26 Claims, 3 Drawing Sheets

START FROM STOP CONTROL METHOD

RELATED APPLICATIONS

This Application is related to copending U.S. Applications Ser. No. 368,011, titled SEMI-AUTOMATIC SHIFT IMPLEMENTATION FOR MECHANICAL TRANSMISSION SYSTEM; U.S. Ser. No. 368,502, titled CONTROL SYSTEM AND METHOD FOR SENSING AND INDICATING NEUTRAL IN A SEMI-AUTOMATIC MECHANICAL TRANSMISSION SYSTEM; U.S. Ser. No. 368,492, titled ENHANCED MISSED SHIFT RECOVERY FOR SEMI-AUTOMATIC SHIFT IMPLEMENTATION CONTROL SYSTEM; U.S. Ser. No. 368,500, titled CONTROL SYSTEM/METHOD FOR CONTROLLING SHIFTING OF A RANGE TYPE COMPOUND TRANSMISSION USING INPUT SHAFT AND MAINSHAFT SPEED SENSORS; and U.S. Ser. No. 368,467, titled AUTOMATIC SHIFT PRESELECTION MODE FOR MECHANICAL TRANSMISSION SYSTEM WITH SEMI-AUTOMATIC SHIFT IMPLEMENTATION; all assigned to Eaton Corporation, the assignee of this Application, and all filed the same day, June 19, 1989.

BACKGROUND OF THE INVENTION

1. Field of the Invention

The present invention relates to control systems/control methods for at least partially automated vehicular mechanical transmission systems, and, in particular, to control systems/control methods for at least partially automated mechanical transmission systems of the type which implement or allow a shift from neutral into a selected gear ratio when the speed of a controlled transmission shaft, such as the input shaft, is caused to be within a given range of the synchronous speed for that shaft in the selected ratio and at the sensed speed of another transmission shaft, such as the output shaft or a mainshaft.

More particularly, the present invention relates to a control system/method for an at least partially automated vehicular mechanical transmission wherein, at start from stop conditions, the range or "window" of controlled shaft rotational speeds at which jaw clutch engagement is initiated/permitted is considerably greater than the range or window utilized for running shifts, and/or the input shaft is monitored for indications of improper inertia brake/input shaft brake operation and/or input shaft drag caused by improper master clutch disengagement and, if such conditions are sensed, the range or window of input shaft speeds at which jaw clutch engagement is initiated/permitted is modified to a value which is very much greater than the range or window of input shaft speeds utilized for running (i.e. on the move) gear changes.

2. Description of the Prior Art

Fully automatic transmission systems, both for heavy-duty vehicles such as heavy-duty trucks, and for automobiles, that sense throttle openings or positions, vehicle speeds, engine speeds, and the like, and automatically shift the vehicle transmission in accordance therewith, are well known in the prior art. Such fully automatic change gear transmission systems include automated transmissions wherein pressurized fluid is utilized to frictionally engage one or more members to other members or to a ground to achieve a selected gear ratio as well as automated mechanical transmissions utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065 and 4,361,060, the disclosures of which are hereby incorporated by reference.

Such fully automatic change gear transmissions can be unacceptably expensive, particularly for the largest heavy-duty vehicles which are not typically sold in high volumes. Additionally, those automatic change gear transmissions utilizing pressurized fluid and/or torque converters tend to be relatively inefficient in terms of power dissipated between the input and output shafts thereof.

Semi-automatic transmission systems utilizing electronic control units which sense throttle position, engine, input shaft, output shaft and/or vehicle speed, and utilize automatically controlled fuel throttle devices, gear shifting devices and/or master clutch operating devices to substantially fully automatically implement operator manually selected transmission ratio changes are known in the prior. Examples of such semi-automatic transmission systems may be seen by reference to U.S. Pat. Nos. 4,425,620; 4,631,679 and 4,648,290, the disclosures of which are incorporated herein by reference.

While such semi-automatic mechanical transmission systems are very well received as they are somewhat less expensive than fully automatic transmission systems, allow manual clutch control for low speed operation and/or do not require automatic selection of the operating gear ratio, they may be too expensive for certain applications as a relatively large number of sensors and automatically controllable actuators, such as a master clutch and/or a fuel throttle device actuators, are required to be provided, installed and maintained.

Partially automated transmission systems including a semi-automatic shift implementation system/method for a mechanical transmission system for use in vehicles having a manually only controlled engine throttle means, and a manually only controlled master clutch are discussed in the above-mentioned copending related patent applications. These systems include a control/display panel or console for operator selection of upshifts, downshifts or shifts into neutral, an electronic control unit (ECU) for receiving input signals indicative of transmission input and output shaft speeds and of manually selected shifts and for processing same in accordance with predetermined logic rules to issue command output signals and a transmission actuator for shifting the transmission in accordance with the command output signals.

The control/display device will allow the operator to select/preselect a shift into a higher ratio, a lower ratio or into neutral and preferably will display the selected but not yet implemented shift as well as the current status of the transmission. Upon the driver manually causing synchronous conditions to occur, the selected shift will automatically be implemented.

Another type of partially automated vehicular mechanical transmission system may be seen by reference to U.S. Pat. No. 4,676,115, the disclosure of which is incorporated herein by reference, and involves sensing values indicative of input and output shaft speeds and not permitting a jaw clutch engagement to be attempted until substantially synchronous conditions are sensed.

In the prior art partially automated vehicular mechanical transmission systems at start from stop conditions the system, when sensing and/or anticipating synchronous, has a "band" or range of speeds that it considers synchronous, called a "window". The prior art systems were not totally satisfactory as, when the vehicle, such as a truck, is at or near zero speed, the "window" be a range of speeds at or near zero input shaft speed. When the driver commands a start gear, he selects the gear, then pushes in the clutch to the bottom of travel to disengage the clutch and actuate the input brake to stop the transmission input shaft. If the input brake is not working properly and/or the clutch pressure plate is warped, the input shaft will slow down at an abnormally slow rate resulting in engagement not being obtainable or in an unacceptable delay in engaging the start gear (a low forward reverse ratio).

Also, if the start gear is engaged at vehicle start from stop when the input shaft is stopped, the driver may not be provided with a positive feedback of jaw clutch engagement.

SUMMARY OF THE INVENTION

In accordance with the present invention, the drawbacks of the prior art have been minimized or overcome by the provision of a control system/control method for an at least partially automated vehicular mechanical transmission wherein, under vehicle start from stop conditions, wherein a vehicle at rest is shifted into an acceptable starting gear, the range or window of input shaft speeds considered acceptable by the system controller for permitting or initiating engagement of the associated jaw clutch members is modified relative to the range or window utilized for running shifts allowing the starting gear to be relatively quickly engaged even if the inertia or input brake is not working well or not working at all or if the clutch pressure plate is warped or misadjusted and dragging and/or to provide the vehicle driver with a pleasing positive feedback of actual jaw clutch engagement.

The above is accomplished by providing an additional algorithm or subroutine effective upon sensing a command or intention to engage a starting gear from neutral with the vehicle master clutch disengaged. Specifically, if an acceptable start gear is attempted or commanded and the vehicle speed indicates the vehicle is at rest and the transmission is in neutral, the rotational speed of the input shaft will be monitored to determine the deceleration rate thereof. If the deceleration rate exceeds a predetermined reference value, this is an indication that the inertia or input brake has been actuated and is properly functioning and that the clutch is not unacceptably out of adjustment or dragging. Under these conditions, in one embodiment, the window for synchronous will be maintained at the normal value (typically about plus or minus 30 RPM). If, however, the sensed input shaft deceleration is at a lower rate than the predetermined reference value, the range or window for synchronous will be opened up to a "degraded mode value" and will remain at that value until such time as the deceleration rate is again greater than the predetermined reference. Typically, the degraded mode value for the range or window of synchronous will be in the range of plus or minus 400 RPM which is considerably greater, more than ten times as great, than the normal range or window of synchronous. While allowing engagement at nonsynchronous conditions of the magnitude defined by the degraded mode range or window is somewhat harsh, experience has indicated that such engagement is acceptable.

As a further improvement, it has been found that start from stop engagement of a start gear from neutral may be improved by providing the operator with a very mild "thump" or "clunk" feedback, very similar to that felt when engaging a gear at rest with a conventional lever operated constant mesh transmission. This is accomplished by providing, at start from stop conditions, a start from stop range or window of synchronous which is considerably increased from the normal running shift range of about plus or minus about 30 RPM. Specifically, utilizing a start from stop range or window of about plus or minus 100-200 RPM allows engaging the starting gear at some input speed greater than nearly zero, regardless of the operation of the input or inertia brake, and provides a very mild and pleasant thump or clunk upon engagement which is a positive feedback to the driver that starting gear engagement has been made and which, testing has indicated, feels positive and good to a typical heavy duty vehicle operator.

Accordingly, a control system/method for improving start from stop operation of a vehicular, at least partially automated, mechanical transmission system has been provided.

This and other objects and advantages of the present invention will become apparent from a reading of the detailed description of the preferred embodiment taken in connection with the attached drawings.

BRIEF DESCRIPTION OF THE DRAWINGS

FIG. 1A is a schematic illustration of the shift pattern of the transmission of FIG. 1.

DESCRIPTION OF THE PREFERRED EMBODIMENT

Figure 1:
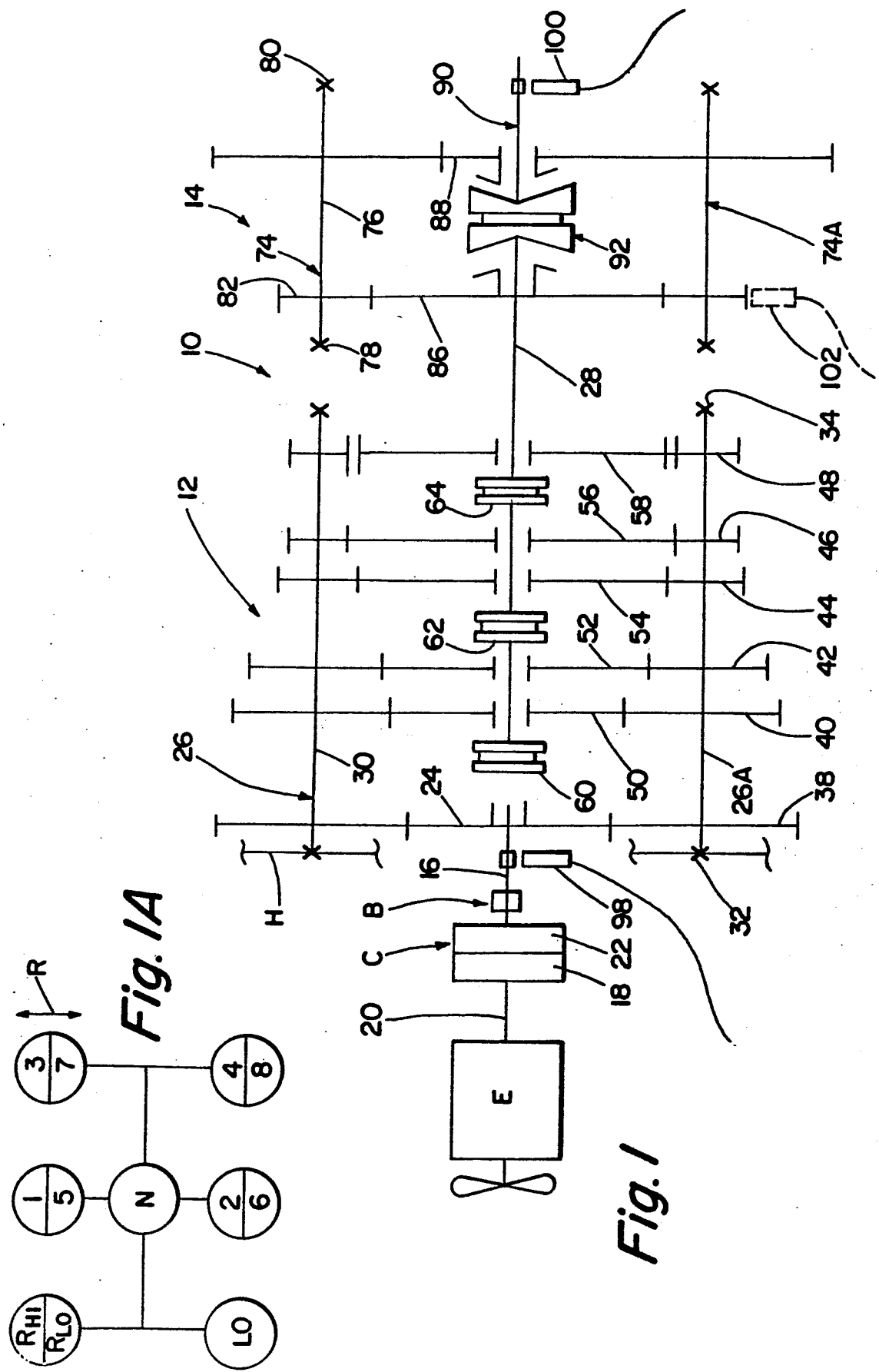
FIG. 1 is a schematic illustration of the vehicular mechanical transmission system partially automated by the system of the present invention.

Certain terminology will be used in the following description for convenience in reference only and will not be limiting. The words "upwardly", "downwardly", "rightwardly", and "leftwardly" will designate directions in the drawings to which reference is made. The words "forward", "rearward", will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words above specifically mentioned, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation in a relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission.

A "selected direction" of shifting will refer to selection of either single or multiple upshifting or downshifting from a particular gear ratio.

Figure 2:
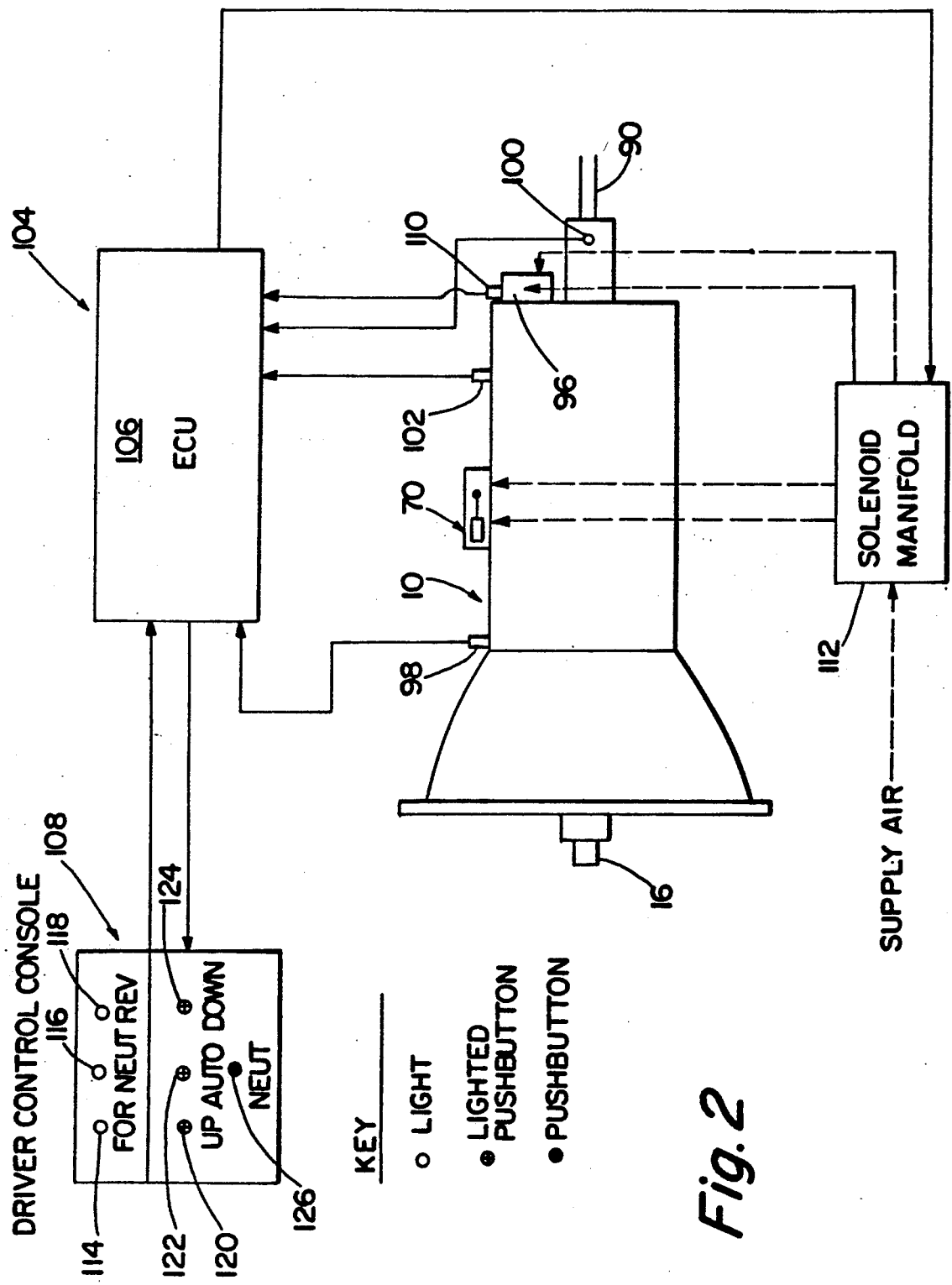
FIG. 2 is a schematic illustration of the semiautomatic shift implementation system for a mechanical transmission system of the present invention.

Referring to FIGS. 1 and 2, a partially automated range type compound mechanical transmission system especially well suited for control by the present invention is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled by a manually controlled throttle device (not shown) and the master clutch C is manually controlled by a clutch pedal (not shown) or the like. An input shaft brake B, operated by overtravel of the clutch pedal, is preferably provided to provide quicker upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known acting nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of a shift lever 72. As is well known, only one of the clutches 60, 62 and 64 is engageable at a given time and main section interlock means (not shown) are provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88 which is fixed to transmission output shaft 90.

A two-position synchronized jaw clutch assembly 92, which is axially positioned by means of a shift fork (not shown) and the range section shifting actuator assembly 96, is provided for clutching either gear 86 to mainshaft 28 for low range operation or gear 88 to mainshaft 28 for direct or high range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

Although the range type auxiliary section 14 is illustrated as a two-speed section utilizing spur or helical type gearing, it is understood that the present invention is also applicable to simple transmissions and to compound range type transmissions utilizing combined splitter/range type auxiliary sections, having three or more selectable range ratios and/or utilizing planetary type gearing. Also, any one or more of clutches 60, 62 or 64 may be of the synchronized jaw clutch type and transmission sections 12 and/or 14 may be of the single countershift type.

For purposes of providing semi-automatic shift implementation operation of transmission 10, an input shaft speed sensor and an output shaft speed sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90.

The semi-automatic shift implementation control system 104 for a mechanical transmission system of the present invention is schematically illustrated in FIG. 2. Control system 104, in addition to the mechanical transmission system 10 described above, includes an electronic control unit 106, preferably microprocessor based, for receiving input signals from the input shaft speed sensor 98, from the output shaft speed sensor 100 (or, alternatively, the mainshaft speed sensor 102) and from the driver control console 108. The ECU 106 may also receive inputs from an auxiliary section position sensor 110.

The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108.

The driver control console allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

·A selection made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine speed (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the operator causing a torque reversal by manually momentarily decreasing and/or increasing the supply of fuel to the engine and/or manually disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e. a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, i.e. the "window" based upon sensed output shaft (vehicle) speed and the ratio to be engaged, which will result in an acceptably synchronous engagement of the ratio to be engaged. For shift quality purposes, for a heavy duty vehicular transmission systems of the type illustrated, a typical window or range for running (i.e. moving) shifts is about ±25 to ±35 RPM. As the operator, by throttle manipulation and/or use of the input shaft brake, causes the input shaft speed to fall within the acceptable range, the ECU 106 will issue command output signals to manifold 112 to cause actuator 70 to engage the mainsection ratio to be engaged. Preferably, the actuator will respond very quickly not requiring the operator to maintain the input shaft speed within the acceptable range for an extended period of time. To select a shift into transmission neutral, selection button 126 is pushed. Indicating light 116 will flash until the ECU confirms that neutral is obtained at which time the light 116 will assume a continuously lighted condition while the transmission remains in neutral.

In the automatic preselection mode of operation, selected by use of lighted pushbutton 122, the ECU will, based upon stored logic rules, currently engaged ratio (which may be calculated by comparing input shaft to output shaft speed) and output shaft speed, determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode by depression of pushbutton 122.

As an alternative, the neutral condition indication light 116 may be eliminated and neutral selection pushbutton 126 replaced by a lighted pushbutton.

Although the present invention is especially well suited for use with the above described partially automated system which semi-automatically executes manually or automatically preselected shifts requiring the operator to (i) cause a torque reversal for disengaging the currently engaged ratio and (ii) to cause substantially synchronous rotation for engagement of the selected mainsection ratio, and which allows the system to operate without requiring automatically operated throttle controls or master clutch actuators, the present invention is not limited to use with such systems. For example, the present invention would also be useful for partially automated transmission systems of the type illustrated in above-mentioned U.S. Pat. No. 4,676,115 where shifts into a selected ratio are inhibited or prohibited until synchronous conditions are sensed.

A concern with a semi-automatic or partially automatic mechanical transmission system requiring an operator or a controller to bring the transmission within an acceptable range of synchronous conditions before the control allows or commands engagement of a target gear ratio is that the ranges are set at relatively small bands, to increase shift quality, which, especially under certain start from stop conditions, may result in the band being difficult to obtain which will result in a prolonged period of the transmission being stuck in neutral which is usually very undesirable. Typically, such semi-automatic mechanical transmissions allow or cause engagement of a selected ratio when the speed of one transmission shaft (usually the input shaft) is within a given range or window (usually about ±30 RPM) of the synchronous speed for that shaft in the selected ratio relative to the sensed speed of another shaft (usually a shaft related to the output shaft). For example, the synchronous speed for the input shaft in a two to one ratio (2:1) when output shaft speed is 1,000 RPM is 2,000 RPM. If the range is ±30 RPM, shifts into the two to one ratio from neutral, when the output shaft speed is 1,000 RPM, will be allowed or caused when and only when the input shaft speed is in the range of 1970-2030 RPM. For such partially automated transmission systems, especially those wherein the operator manually causes the substantially synchronous conditions, start from stop operations are a concern as the input shaft speed must be brought from idle (usually about 600-700 RPM in a diesel engine) to almost rest which may take an unacceptably long period of time and/or not be achievable if either the input shaft brake is not actuated or is inoperative or if the master clutch is warped or otherwise damaged and does not completely disengage.

Also, engagement of a start ratio at start from stop from neutral may not provide the operator with sufficient feedback.

Figure 3:
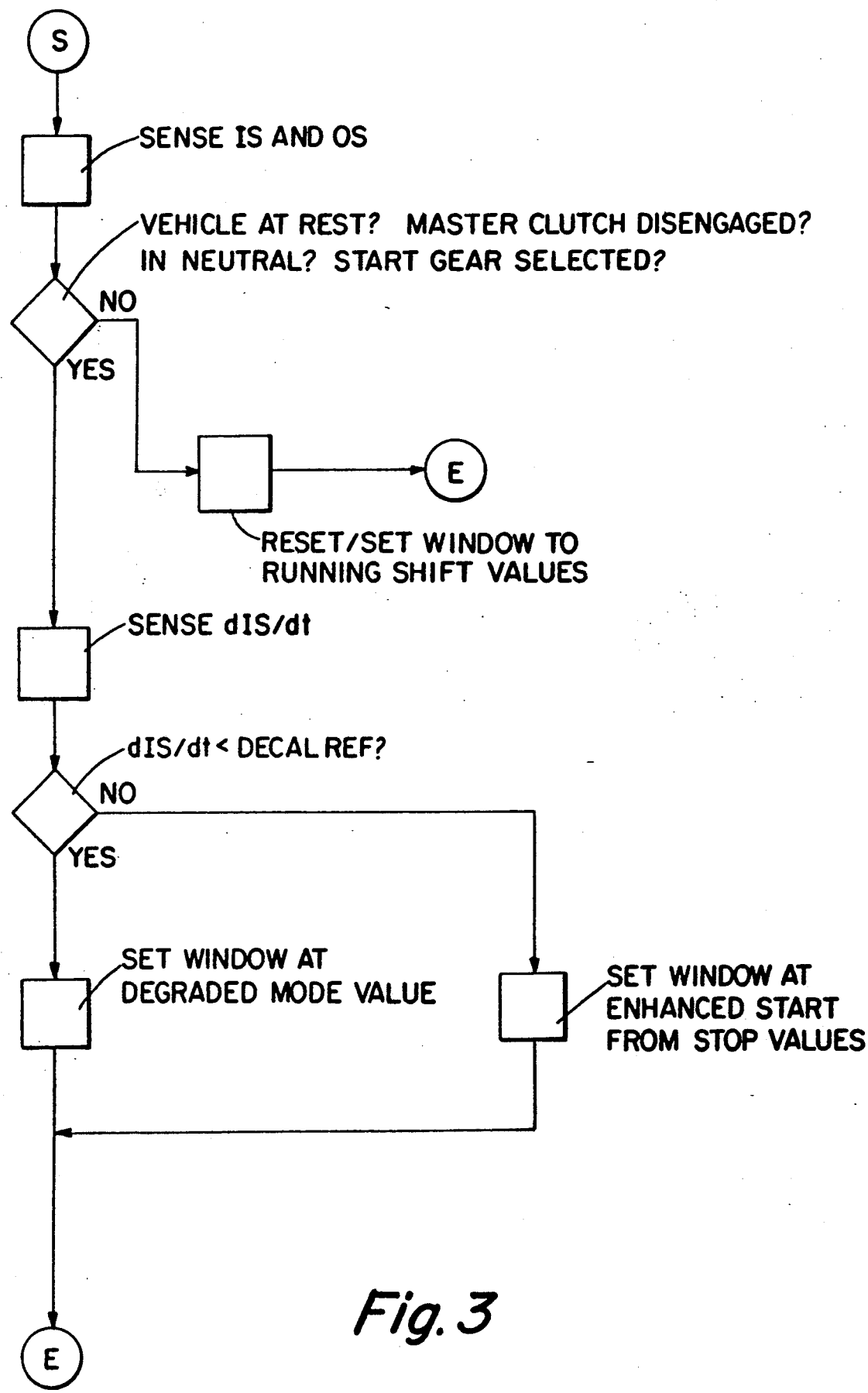
FIG. 3 is a flow chart representation of the present invention.

The enhanced start from stop jaw clutch control system/control method of the present invention is illustrated in flow chart format in FIG. 3. At the start of the control procedure, the current values for input shaft speed (IS) and output shaft speed (OS) are sensed. It is then determined if conditions appropriate for the enhanced start from stop control method are present by determining if all of the four conditions are true, namely, (i) is the vehicle at rest?, (ii) is the master clutch disengaged?, (iii) is the transmission in neutral?, and (iv) has an acceptable start gear been selected.

It is determined if the vehicle is at or substantially at rest by comparing the value of output shaft speed to a reference value corresponding to relatively low vehicle speed. Typically, the vehicle is considered to be at rest if the output shaft speed indicates that the vehicle is moving at a speed no greater than two miles per hour. In transmission control systems such as that illustrated in FIGS. 1 and 2 where a master clutch position sensor is not provided, disengagement of the master clutch is determined by comparing the value of input shaft speed to a reference value slightly less than the value of the input shaft speed when rotating at engine idle. Typically, for well known diesel engines, idle speed is in the range of 600-700 RPM and the master clutch will be declared disengaged if the input shaft speed is equal to or less than about 500 RPM.

If one or more of the enhanced start from stop control method enabling conditions do not exist, the band or range of input shaft speeds which the control will consider as synchronous is set to or allowed to remain at the range or window utilized for running shifting. Typically, in a transmission of the type illustrated in FIGS. 1 and 1A above, this range is about 30 RPM on either side on the true synchronous speed. (i.e. ±30 RPM).

If the enabling conditions for the enhanced start from stop control method are present, the control will then sense the rate of change of input shaft speed to determine if the input shaft is decelerating at a satisfactory rate. If the rate of deceleration of the input shaft is less than a predetermined value, this is indicative of either a failure to actuate the input shaft brake, a failure of the input shaft brake per se and/or some type of warpage in the master clutch creating an unsatisfactory drag on the input shaft. If the input shaft is decelerating at a satisfactory level, i.e. if the IS/dt is less than a deceleration reference, then the range or band of synchronous is set at an enhanced start from stop value. Typically, the enhanced start from stop value of the range or window is about ±100-200 RPM whereby synchronous conditions are somewhat easier to obtain and, when the jaw clutch is engaged a slight "thump" or "clunk" will exist providing the operator with a satisfactory indication that a start gear has been engaged. It is noted that if the vehicle is at rest and if the transmission is engaged at exactly synchronous conditions, the operator will not be provided with a positive feedback of engagement of the jaw clutch. In transmissions of the type illustrated in FIG. 1 and discussed above, the deceleration reference value is about minus 400 RPM/second.

If the deceleration rate is not acceptable, then the window for synchronous is set at a degraded mode value. Typically, this degraded mode value is about ±400 RPM and is thus quite a bit larger than the enhanced start from stop value of the window. It has been found that allowing a shift into a start gear at start from stop conditions when the input shaft is at about 400 RPM, while being somewhat rough, is marginally acceptable and does not provide severe damage to the transmission components.

While an acceptable start gear for the 9 speed transmission illustrated in FIG. 1 is usually considered to be first and second, reverse may also be considered an acceptable start gear.

With the enhanced start from stop jaw clutch engagement control method/system of the present invention, an input brake and/or inertia brake is not absolutely necessary. However, it may be very desirable to utilize an input brake and/or inertia brake since these devices result in quicker, smoother engagements from neutral at rest and also allow fast upshifts independent of the engine speed decay rate. The enhanced control also makes shifting from a forward gear to neutral to reverse, and vice versa, easier since almost immediate engagement will occur if the vehicle is stopped and the master clutch is disengaged.

Accordingly, it may be seen that an enhanced start from stop jaw clutch engagement control method/control system for partially automated transmissions of the type initiating and/or allowing jaw clutch engagement only upon sensing that the rotational speed of a monitored controlled shaft is within a band or range of speeds generally centered about the true rotational speed for the target ratio and a sensed speed of a second shaft, i.e. a synchronous window, is provided. The control system requires input signals indicative of transmission input shaft speed and of transmission output shaft speed but does not require sensing of master clutch or input shaft brake condition or position.

Although the present invention has been described with a certain degree of particularity, it is understood that various changes to form and detail may be made without departing from the spirit and the scope of the invention as hereinafter claimed.

We claim:

1. A control system for controlling the implementation of selected shifts of a mechanical change gear transmission system comprising a fuel throttle control engine (E) having a known idle speed, a multiple speed change gear mechanical transmission (10), a master friction clutch (C), drivingly interposed between the engine and transmission, a first sensor (98) for providing a first input signal indicative of transmission input shaft (16) rotational speed, a second sensor (100) for providing a second input signal indicative of the rotational speed of a transmission shaft (90) independently rotatable relative to the transmission input shaft under at least certain transmission operating conditions, selection means (120, 124, 126) for selecting an upshift or downshift from a currently engaged transmission ratio or from neutral into a selected ratio and for providing a third input signal indicative of said selection, a transmission actuator (112, 70, 96) for controlling shifting of the transmission and a central processing unit (106) for receiving said first, second and third input signals and for processing same in accordance with predetermined logic rules to issue command output signals to said actuator, said central processing unit including means for sensing jaw clutch engagement enabling conditions including sensing that the value of said first input signal is within an acceptable range defined by an upper value and a lower value and containing the value of said first input signal corresponding to the calculated synchronous speed of said input shaft for the current value of said second input signal and at engagement of said selected ratio, said upper and lower values separated by a separation value determined by the sensed operating conditions of said transmission system, said system characterized by:

said means for sensing enabling conditions sensing selection of a dynamic shift into a low vehicle speed selected ratio and responding thereto by utilizing a dynamic shift separation value to define said range, and said means for sensing enabling conditions sensing selection of a vehicle start ratio from vehicle start from stop conditions and responding thereto by utilizing a start from stop separation value, larger than said dynamic shift separation value, to define said range.

2. The control system of claim 1 wherein said second sensor provides a signal indicative of the rotational speed of a transmission output shaft.

3. The control system of claim 2 wherein said start from stop separation value is at least twice as large as said dynamic shift separation value.

4. The control system of claim 2 wherein said start from stop separation value is at least four times as large as said dynamic shift separation value.

5. The control system of claim 1 wherein said means for sensing enabling conditions senses degraded clutch operation when selecting a start ratio from vehicle start from stop conditions and responds thereto by utilizing a degraded clutch operation separation value, larger than said start from stop separation value, to define said range.

6. The control system of claim 5 wherein said degraded clutch operation separation value is at least eight times as large as said dynamic shift separation value.

7. The control system of claim 5 wherein said degraded clutch operation separation value is at least ten times as large as said dynamic shift separation value.

8. The control systems of claims 1, 2, 3, 4, 5, 6, or 7 wherein said start from stop vehicle conditions are sensed when the following conditions are sensed (i) vehicle speed is less than or equal to a nominal reference value, (ii) the master clutch has been moved towards disengagement and (iii) the transmission is currently in neutral.

9. The control system of claim 8 wherein said means for sensing enabling conditions senses movement of said master clutch towards disengagement when said first input signal is less than or equal to a reference value corresponding to the speed of said input shaft when rotating at a speed somewhat lower than the idle speed of said engine.

10. The control system of claim 5 wherein degraded clutch operation is sensed by calculating a derivative of said first input signal with respect to time and comparing said derivative to a reference value corresponding to acceptable deceleration of said input shaft at substantially full master clutch disengagement and with acceptable operation of a transmission input shaft braking device.

11. The control system of claim 8 wherein degraded clutch operation is sensed by calculating a derivative of said first input signal with respect to time and comparing said derivative to a reference value corresponding to acceptable deceleration of said input shaft at substantially full master clutch disengagement and with acceptable operation of a transmission input shaft braking device.

12. The control system of claim 9 wherein degraded clutch operation is sensed by calculating a derivative of said first input signal with respect to time and comparing said derivative to a reference value corresponding to acceptable deceleration of said input shaft at substantially full master clutch disengagement and with acceptable operation of a transmission input shaft braking device.

13. A control system for controlling the implementation of selected shifts of a mechanical change gear transmission system comprising a fuel throttle controlled engine having a known idle speed, a multiple speed change gear mechanical transmission, a master friction clutch drivingly interposed between the engine and the transmission, a first sensor for providing a first input signal indicative of transmission input shaft rotational speed, a second sensor for providing a second input signal indicative of transmission output shaft rotational speed, selection means for selecting an upshift or a downshift from a currently engaged transmission ratio or from transmission neutral into a selected ratio and for providing a third input signal indicative of said selection, a transmission actuator for controlling shifting of a transmission and a central processing unit for receiving said first, second and third input signals and for processing same in accordance with predetermined logic rules to issue command output signals to said actuator, said central processing unit including means for sensing jaw clutch engagement enabling conditions including sensing that the current value of said first input signal is within an acceptable range defined by an upper value and a lower value and containing the value of said first signal when said input shaft is rotating at the calculated synchronous speed thereof for the current output shaft speed and at engagement said selected ratio, said upper and lower values separated by a separation value determined by sensed transmission system operating conditions, said system characterized by;

said means for sensing enabling conditions sensing selection of a dynamic shift into a low vehicle speed selected ratio and responding thereto by utilizing a dynamic shift separation value to define said range, said means for sensing enabling condition sensing degraded clutch operating conditions during selection of engagement of a start ratio from vehicle start from stop conditions and utilizing a degraded clutch operation separation value, considerably greater than said dynamic shift separation value, to define said range.

14. The control system of claim 13 wherein said degraded clutch operation separation value is at least eight times as great as said dynamic shift separation value.

15. The control system of claims 13 or 14 wherein said means for sensing enabling conditions senses degraded clutch operating conditions by determining the value of a derivative with respect to time of said first input signal and comparing said derivative to a reference value corresponding to the deceleration of said input shaft upon substantially full disengagement of said master friction clutch and satisfactory operation of an input shaft retarding device.

16. The control system of claim 15 wherein said means for sensing vehicle start from stop operating conditions senses such conditions upon sensing (i) movement of the master friction clutch to the disengaged position thereon, (ii) vehicle speed being less than or equal to a predetermined nominal reference value, (iii) transmission being currently engaged in the neutral condition.

17. The control system of claim 15 wherein said means for sensing said enabling conditions senses movement of said master clutch towards the disengaged condition thereof by comparing said first input signal to a reference value corresponding to rotation of said input shaft at a speed somewhat slower than the idle speed of said engine.

18. A method for controlling an at least partially automated mechanical transmission system comprising a manually controlled fuel throttle controlled engine having a known idle speed, a multiple speed change gear mechanical transmission, a master friction clutch drivingly interposed between the engine and the transmission, a first sensor for providing an input signal indicative of transmission input shaft speed and a second sensor for providing an input signal indicative of transmission output shaft speed, said method including sensing substantially synchronous conditions for engaging a target ratio when the rotational speed of said transmission input shaft is within a synchronous range defined by an upper value, a lower value and containing the speed of said input shaft upon engagement of the selected target ratio at existing output shaft speed, said upper and lower values separated by a separation value depending upon vehicle operating conditions, said separation value having a dynamic shifting value during dynamic engagement of low vehicle speed target ratios, said method characterized by;

sensing desired engagement of transmission start ratios at start from stop conditions and responding thereto by utilizing a start from stop separation value, larger than said dynamic separation value, to determine said synchronous range.

19. The control method of claim 18 wherein said start from stop separation value is at least four times as large as said dynamic shift separation value.

20. The control method of claim 19 wherein start from stop conditions are sensed by sensing (i) master clutch being moved to the disengaged condition thereof, (ii) vehicle speed being less than a predetermined nominal value, (iii) that the transmission is currently engaged in neutral.

21. The control method of claim 20 wherein sensing movement of the master clutch to the disengaged condition thereof comprises comparing the current value of input shaft speed to a reference value corresponding to rotation of said input shaft at a speed somewhat lower than the idle speed of said engine.

22. A method for controlling an at least partially automated mechanical transmission system comprising a fuel throttle controlled engine having a known idle speed, a multiple speed change gear mechanical transmission, a master friction clutch drivingly interposed between the engine and the transmission, a first sensor for providing a first input signal indicative of transmission input shaft rotational speed, a second sensor for providing a second input signal indicative of transmission output shaft rotational speed and a central processing unit for receiving input signals and for processing same in accordance with predetermined logic rules to issue command output signals, said method including sensing substantially synchronous conditions for engagement of a selected target ratio when the rotational speed of said input shaft is within a synchronous range defined by an upper value and a lower value and containing the speed of said transmission input shaft upon engagement of said selected target ratio at existing output shaft speed, said upper and lower values separated by a separation value dependent upon the vehicle operating conditions, said separation value having a dynamic shifting value during dynamic engagement of a low vehicle speed target ratio, said method characterized by:

sensing degraded master clutch operation during desired engagement of a transmission start ratio and vehicle start from stop conditions and responding thereto by utilizing a degraded clutch operation separation value considerably larger than said dynamic shifting separation value.

23. The control method of claim 22 wherein said degraded clutch operation separation value is at least eight times as great as said dynamic shifting separation value.

24. The control method of claim 22 or 23 wherein degraded clutch operation is sensed by calculating a derivative of said input shaft speed with respect to time and comparing said derivative value to a reference corresponding to acceptable input shaft deceleration with satisfactory disengagement of said master clutch and satisfactory operation of an input shaft retarding device.

25. The control method of claim 24 wherein start from stop conditions are sensed by sensing (i) master clutch being moved to the disengaged condition thereof, (ii) vehicle speed being less than a predetermined nominal value, (iii) that the transmission is currently engaged in neutral.

26. The control method of claim 25 wherein sensing movement of the master clutch to the disengaged condition thereof comprises comparing the current value of input shaft speed to a reference value corresponding to rotation of said input shaft at a speed somewhat lower than the idle speed of said engine.

* * * * *